(12) United States Patent
Huang et al.

(10) Patent No.: US 9,998,182 B2
(45) Date of Patent: Jun. 12, 2018

(54) NFC ANTENNA FOR WEARABLE APPLICATION

(71) Applicant: Futurewei Technologies, Inc., Plano, TX (US)

(72) Inventors: Wei Huang, San Diego, CA (US); Ping Shi, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days. days.

(21) Appl. No.: 15/012,220

(22) Filed: Feb. 1, 2016

(65) Prior Publication Data

US 2017/0222692 A1 Aug. 3, 2017

(51) Int. Cl.
*H04B 5/00* (2006.01)
*H04B 1/3827* (2015.01)

(52) U.S. Cl.
CPC ......... *H04B 5/0081* (2013.01); *H04B 1/3827* (2013.01); *H04B 5/0031* (2013.01)

(58) Field of Classification Search
CPC .................................................. H04W 4/008
USPC ..................................... 455/41.1, 41.2, 41.3
See application file for complete search history.

(56) References Cited

U.S. PATENT DOCUMENTS

| 2008/0151695 | A1* | 6/2008 | Kimel | A61J 7/0481 |
| | | | | 368/10 |
| 2012/0194976 | A1 | 8/2012 | Golko et al. | |
| 2014/0187157 | A1* | 7/2014 | Liao | H04B 5/0037 |
| | | | | 455/41.1 |
| 2014/0313128 | A1 | 10/2014 | Golko et al. | |
| 2015/0140927 | A1* | 5/2015 | Chen | G06K 19/0727 |
| | | | | 455/41.1 |
| 2015/0309533 | A1 | 10/2015 | Majava et al. | |
| 2016/0062319 | A1* | 3/2016 | Kim | G04C 10/00 |
| | | | | 368/204 |
| 2016/0172890 | A1* | 6/2016 | Jeong | H02J 7/04 |
| | | | | 320/108 |
| 2016/0187857 | A1* | 6/2016 | Cho | G04R 20/00 |
| | | | | 368/47 |

FOREIGN PATENT DOCUMENTS

CN 1716691 1/2006
CN 102402183 4/2012
(Continued)

OTHER PUBLICATIONS

"International Application No. PCT/CN2017/072216, International Search Report dated May 4, 2017", (dated May 4, 2017), 4 pgs.

*Primary Examiner* — Wen Huang
(74) *Attorney, Agent, or Firm* — Schwegman Lundberg & Woessner, P.A.

(57) ABSTRACT

Methods, apparatus and systems are provided that include NFC antennas for applications in wearable mobile communication devices. In one aspect, a wearable mobile communication device includes an electronics block, or electronics body, including a processing unit for near field communications; and an adjustable strap configured to retain the electronics block when worn by a wearer. The strap includes a conductive material connected to form a coil with at least one turn and separated by a non-conductive material that configured to fill a gap between turns of the coil. The coil is electrically connected to the electronics block and comprises a near field communication (NFC) antenna.

20 Claims, 10 Drawing Sheets

(56) References Cited

FOREIGN PATENT DOCUMENTS

| | | |
|---|---|---|
| CN | 203311176 | 11/2013 |
| CN | 204241848 | 4/2015 |
| EP | 1612884 | 10/2008 |
| JP | 5838676 | 1/2016 |

* cited by examiner

NFC ANTENNA FOR WEARABLE APPLICATION

TECHNICAL FIELD

The present disclosure relates to wireless communication. More specifically, the present disclosure relates to a wearable antenna for short range wireless communication.

BACKGROUND

Mobile communication devices use a variety of wireless protocols to establish links to other devices. Near field communication (NFC) protocols enable these devices to establish radio frequency communication by bringing the devices within close proximity of each other. NFC operates at the radio frequency band of 13.56 MHz, which requires a relatively large size antenna or coil and thus limits NFC's application in certain smaller mobile communication devices such as wearable devices. There is a need for improved NFC antennas for wearable applications.

SUMMARY

Methods, apparatus and systems are provided that include NFC antennas for applications in wearable mobile communication devices. In one aspect, a wearable mobile communication device includes an electronics block, or electronics body, including a processing unit for near field communications; and an adjustable strap configured to retain the electronics block when worn by a wearer. The strap includes a conductive material connected to form a coil with at least one turn and separated by a non-conductive material that configured to fill a gap between turns of the coil. The coil is electrically connected to the electronics block and comprises a near field communication (NFC) antenna.

Another aspect provides a strap for a wearable communication device including a substrate portion configured to retain the wearable communication device when worn by a wearer. In various embodiments, the strap includes a coil proximate a perimeter of the substrate portion, and the coil is electrically connected to the wearable communication device and comprises a near field communication (NFC) antenna Another aspect provides a method for providing an adjustable strap configured to retain an electronics block when worn by a wearer. According to various embodiments, the strap is formed using a coil proximate a perimeter of a substrate. The coil is electrically connected to the electronics block and comprises a portion of a near field communication (NFC) antenna, in various embodiments.

DETAILED DESCRIPTION

Figure 1A:
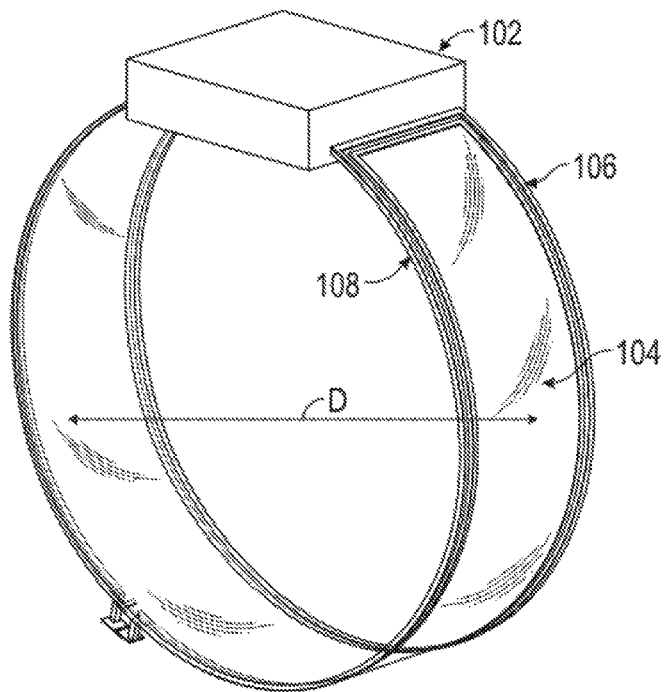
FIGS. 1A-1C illustrate perspective views of an NFC antenna for wearable application according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense and the scope of the present invention to be interpreted broadly, as defined by the appended claims.

Near field communication (NFC) protocols that operate at the radio frequency band of 13.56 MHz enable mobile communication devices to establish radio frequency communication by bringing the devices within close proximity of each other. The use of NFC in mobile devices is increasing in a variety of mobile devices, such as cellular telephones and accessories. NFC devices can be used in three modes: active mode for tag reading and pairing, passive mode for card emulation/payment, and peer-to-peer mode for sharing. Currently, wearable devices lack a sufficient human input interface due to their small size. The present subject matter provides NFC for wearable devices to enable functions such as e-wallet, peer-to-peer (P2P) mode for information exchange, authentication and access control, and reader/writer mode for information reading. Wearable devices are closely coupled to human behavior and aesthetic appeal plays an import role in the design wearable devices, such as smart watches.

The frequency band of NFC at 13.56 MHz uses a large size antenna/coil, limiting NFC's application in certain types of smaller devices. Due to the limited space and a metal environment, a conventional planar NFC antenna does not work properly in these smaller wearable devices. One previous way to address the limited space for NFC was to use active load modulation (emulating passive mode) to boost generated signal strength in passive mode, thus using an antenna requiring only a fractional volume of a typical NFC antenna. However, active load modulation does not work for the other two NFC modes and as a result; devices using this technology cannot claim NFC compliance. In addition, there is no existing NFC solution for a metal watch body or metal strap.

The present subject matter provides a method of design of NFC antennae using watch straps. An NFC antenna designed on straps for smart watch can be made with metal and non-conductive material, in various embodiments. The length of strap can be adjusted to accommodate different wrist sizes, in an example embodiment. A method to fabricate NFC antennae using metallic and non conductive materials is provided. For near field magnetic field coupling, a coil type antenna is preferred to get maximum magnetic field flux. The detection distance is related to coil turns and area, such that more turns and a bigger area will increase flux but at the cost of matching. Typical inductance is targeted between 1 microHenry (uH) to 2 uH, in various embodiments. In order to support ISO/IEC-14443 A/B, a bandwidth of ~1.92 MHz, or Q of ~35±10% is used, in various embodiments. The wavelength at the NFC frequency (13.56 MHz) is approximately 22.12 meters long, and as such the strap length's (and any adjustment thereto) effect is negligible on the NFC performance of the device.

Figure 1B:
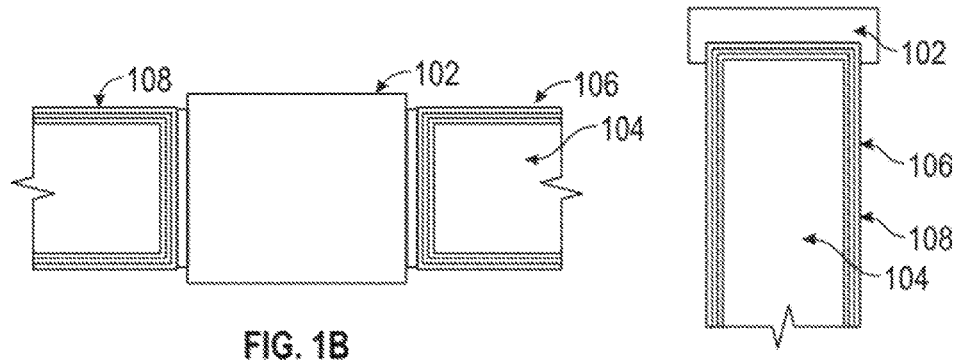
Figure 1C:
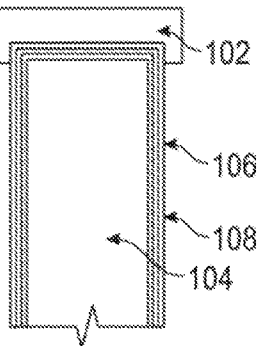

FIGS. 1A-1C illustrate perspective views of an NFC antenna for wearable application according to an example embodiment. In FIG. 1A, a wearable mobile communication device includes an electronics block 102 including a display and an adjustable strap configured to retain the electronics block when worn by a wearer. In various embodiments, the strap 108 includes a substrate 104 and a coil 106 proximate a perimeter of the substrate, wherein the coil 106 is electrically connected to the electronics block 102 and comprises a near field communication (NFC) antenna. "Proximate the perimeter" refers to a position of the coil at or near the perimeter of the substrate or strap in the present subject matter. In an example embodiment, the electronics block 102 is a watch. The coil 106 may include copper or other metals, in various embodiments. The substrate 104 may or may not include magnetic material including a ferrite, in various embodiments. The diameter D of the watch strap can be variable, and in one example the diameter is approximately 55 millimeters (mm). The size of the electronics block 102 can vary, and in one example the electronics block is approximately 40 mm by 35 mm. The coil 106 can have a variety of widths, gaps (space between turns) and number of turns in various embodiments. In one example embodiment, the width of a turn of the coil 106 is approximately 1 mm, the coil 106 has 2 turns, and the turns have a gap between them of approximately 1 mm. In various embodiments, the width, turns and gap of the coil 106 depend on the permittivity of the substrate. In the example of FIG. 1A, the coil 106 has an inductance of approximately 1.6 uH and a Q factor value of approximately 38. The Q factor value describes how under-damped an oscillator or resonator is, and characterizes a resonator's bandwidth relative to its center frequency According to various embodiments, the coil 106 is a 13.56 MHz antenna. The coil 106 supports NFC antenna operation in active mode, passive mode, and peer-to-peer mode, in various embodiments. The strap includes a non-conductive material configured to act as a substrate 104, in an example embodiment. Examples of the non-conductive material include, but are not limited to, plastic or leather. The strap includes a metal, in various embodiments. In an example embodiment, the coil 106 has an inductance between 1 uH and 2 uH. The electronics block includes a watch display, in various embodiments.

The present subject matter provides a strap for a wearable communication device including a substrate portion 104 configured to retain the wearable communication device when worn by a wearer. In various embodiments, the strap includes a coil proximate a perimeter of the substrate portion, wherein the coil is electrically connected to the wearable communication device and comprises a near field communication (NFC) antenna. According to various embodiments, a length of the strap is adjustable by removing or adding a section of the strap. The strap further includes a retaining mechanism to hold the strap on a wearer, and further to make a conductive connection between portions of the coil 106 on sections of the substrate portion that are joined by the retaining mechanism (such as shown in FIG. 7B), in an example embodiment. The retaining mechanism can include, but is not limited to, a snap or button. In various embodiments, the watch strap acts as the substrate of the NFC antenna, and it is not necessary to make the substrate be a ferrite material, it can be plastic, leather or other dielectric material. The material can include elastic or stretchable material, in an example embodiment. In various embodiments, a tunable capacitor is used, such as a shunt capacitor, to fine tune the antenna. The tunable capacitor can be located in the electronics block, in an example embodiment.

Figure 9A:
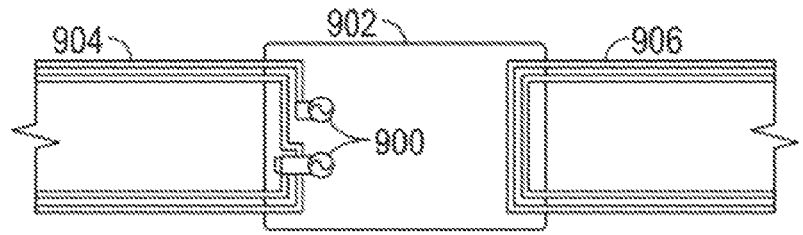
FIGS. 9A-9C illustrate a top view of a feed for an NFC antenna for wearable application according to an example embodiment.
Figure 9B:
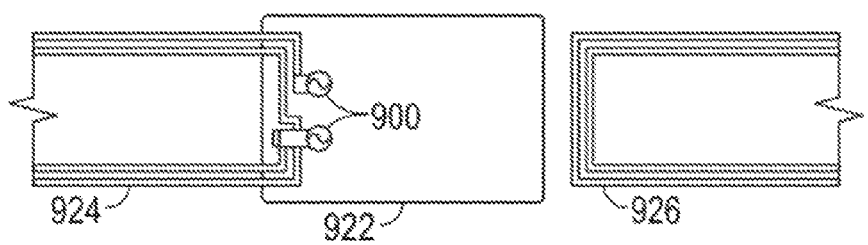
Figure 9C:
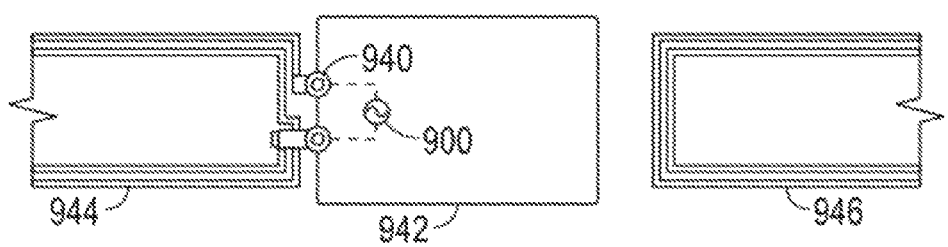

The present subject matter provides a method including an antenna coil in a strap to function as an NFC antenna. According to various embodiments, the strap 108 includes a substrate 104 and a coil 106 proximate a perimeter of the substrate, as shown in FIG. 1B. The coil 106 is electrically connected to the electronics block 102 and comprises a portion of a near field communication (NFC) antenna, in various embodiments. In various embodiments, the coil is molded in the strap 108, as shown in FIG. 1C. The strap 108 can include a mold in thermo-elastic materials, or connected on the metallic or non-metallic strap. The portion of the NFC antenna in the strap 108 can be connected to a second portion of the NFC antenna in the electronics block as shown in FIGS. 9A-9C, in various embodiments. In one embodiment, the bending portion of the antenna is located inside the wearable device, allowing variable length of strap to fit wrists of different sizes. A metallic contact is used to provide a connection of antenna elements in the strap and in the wearable device or electronics block, in an embodiment. The coil is electrically connected to the electronics block, or electronics body, in various embodiments. FIGS. 9A-9C illustrate a top view of a feed for an NFC antenna for wearable application according to an example embodiment. In FIG. 9A, both ends 904, 906 of the strap have a portion of the NFC antenna inside the electronics block 902 (watch body), and the NFC antenna can be fed from source 900 at either side. In FIG. 9B, one end 924 of the strap has a portion of the NFC antenna inside the electronics block 922 (watch body) and the other end 926 is outside the body, and the NFC antenna can be fed at the side which is inside the body. In various embodiments, the inside portion of the NFC antenna 924 can be printed on a printed circuit board (PCB) and connected to the outside portion using hinges. In FIG. 9C, no portion of the strap has a portion of the NFC antenna inside the electronics block 942 (watch body). Instead, one end 944 (or both ends 944, 946) of the strap are fed using a connection through a hinge 940 or similar type structure that is connected to the electronics block 942.

Figure 2A:
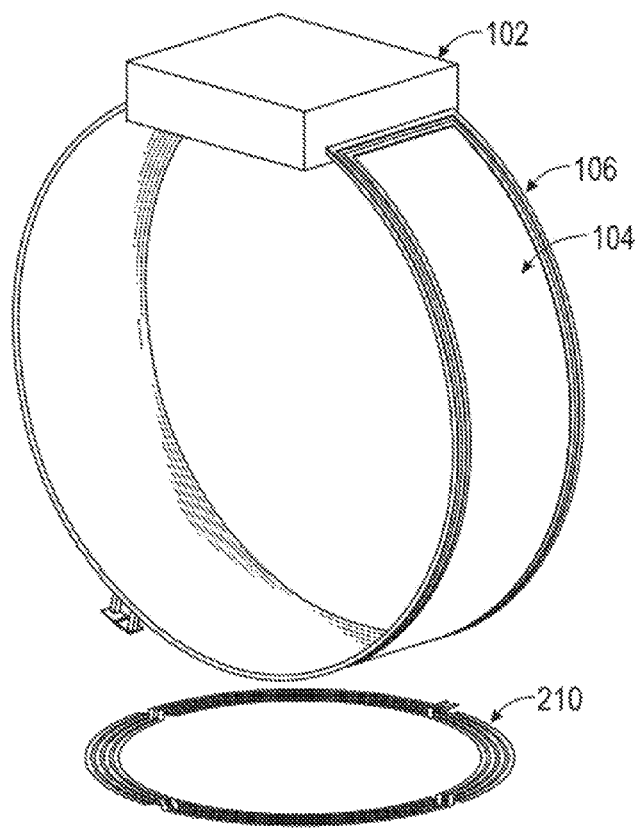
FIG. 2A illustrates a side view of an NFC antenna for wearable application in proximity to a second NFC antenna according to an example embodiment.
Figure 2B:
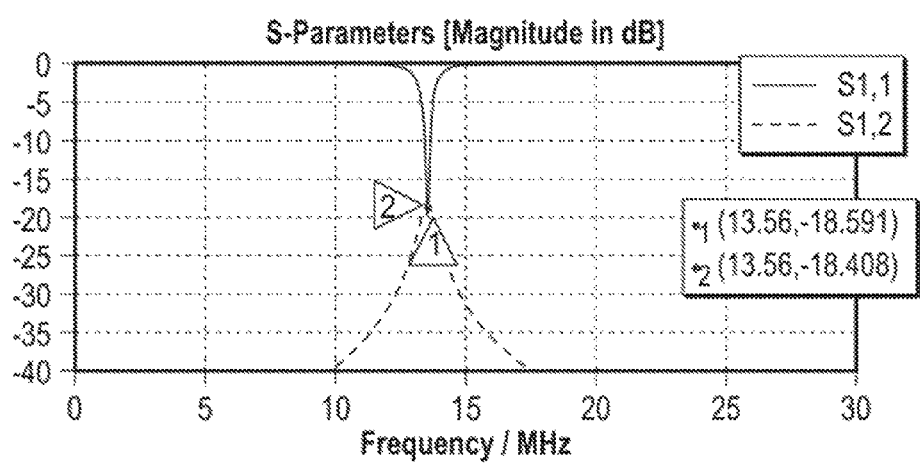
FIG. 2B is a graph illustrating coupling between the antennas of FIG. 2A according to an example embodiment.

FIG. 2A illustrates an NFC antenna for wearable application using a coil 106 in proximity to a second NFC antenna 210 according to an example embodiment. FIG. 2B is a graph illustrating coupling between the antennas of FIG. 2A when brought to within 30 mm of each other, according to an example embodiment. The second NFC antenna 210 includes a standard coil, for the depicted graphical illustration. As shown in FIG. 2B, coupling between the NFC antenna and the second NFC antenna is approximately −18 db at 13.56 MHz with the two coils are 30 mm apart. The coupling level indicates that the NFC antenna of the present subject matter can meet the requirements for NFC protocol for all three modes of NFC communication (active, passive and peer-to-peer).

Figure 3A:
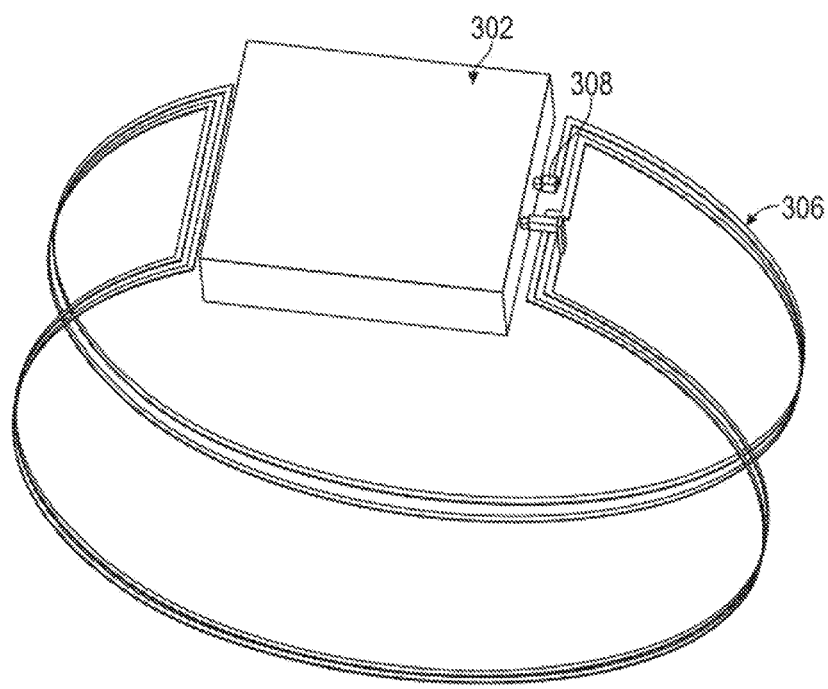
FIG. 3A illustrates a top view of an NFC antenna for wearable application that is fed from the watch body according to an example embodiment.
Figure 3B:
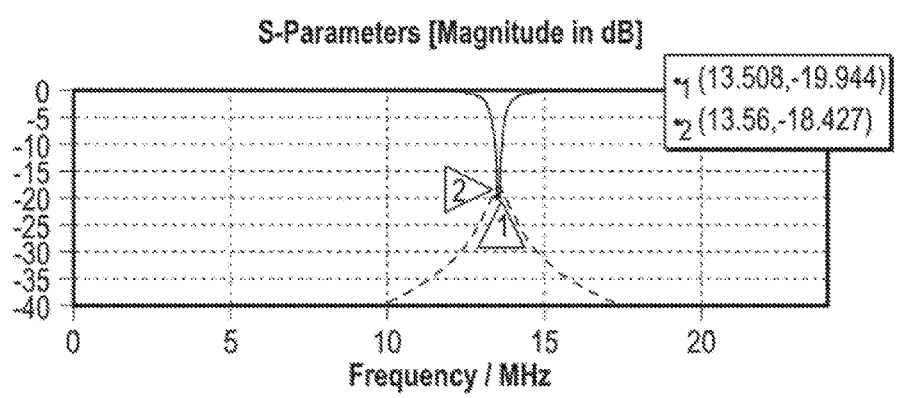
FIG. 3B is a graph illustrating coupling between the NFC antenna of FIG. 3A and a second NFC antenna according to an example embodiment.

FIG. 3A illustrates an NFC antenna for wearable application that includes a coil 306 is fed from a watch body 302 at contacts 308 according to an example embodiment. FIG. 3B is a graph illustrating coupling between the NFC antenna of FIG. 3A and a second NFC antenna according to an example embodiment. The coupling is again approximately −18 db at 13.56 MHz with the two coils are 30 mm apart, illustrating that there is negligible effect on the coupling from the antenna feed location.

Figure 4A:
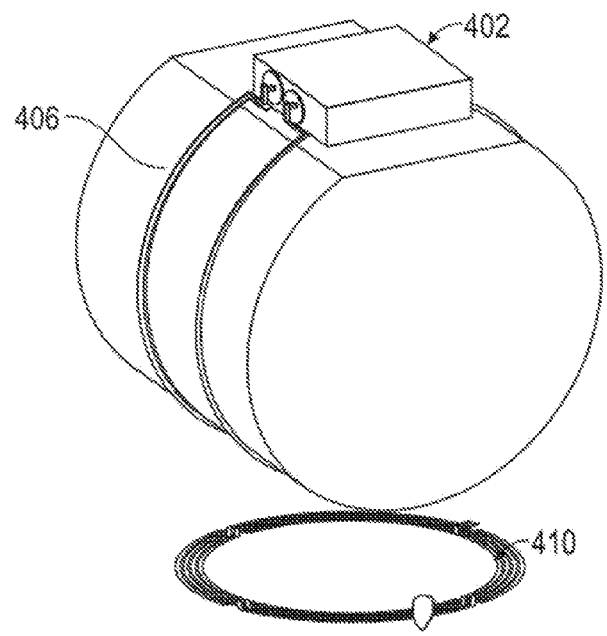
FIG. 4A illustrates a side view of an NFC antenna for wearable application as worn on a human arm phantom in proximity to a second NFC antenna according to an example embodiment.
Figure 4B:
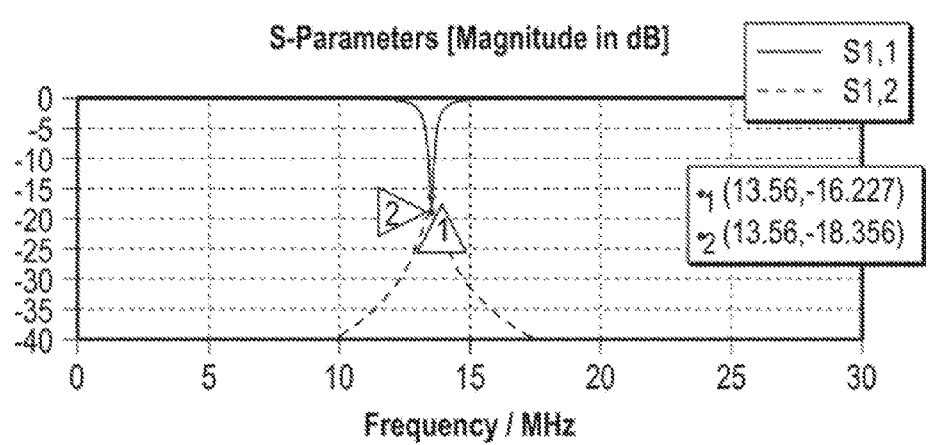
FIG. 4B is a graph illustrating coupling between the antennas of FIG. 4A according to an example embodiment.

FIG. 4A illustrates an NFC antenna 406 for wearable device 402 as worn on a human arm phantom in proximity to a second NFC antenna 410 according to an example embodiment. FIG. 4B is a graph illustrating coupling between the antennas 406 and 410 of FIG. 4A according to an example embodiment. As shown at point 2 in FIG. 4B, the coupling is approximately −19 decibels (db) at 13.56 MHz with the two coils are 30 mm apart, illustrating that there is little effect on the coupling from the human body in the desired frequency range. Coupling from the human body or arm can interfere with antenna transmission and reception, and the present subject matter provides a larger antenna than could be provided within the device body, thus diminishing the effects of coupling.

Figure 5A:
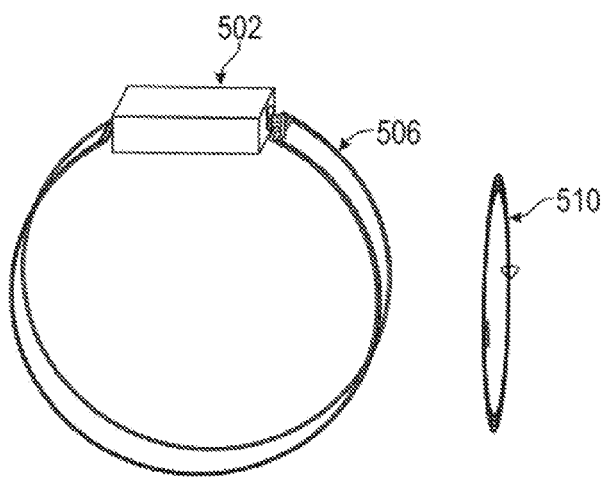
FIG. 5A illustrates a side view of an NFC antenna for wearable application in proximity to a second NFC antenna at a side of the NFC antenna according to an example embodiment.
Figure 5B:
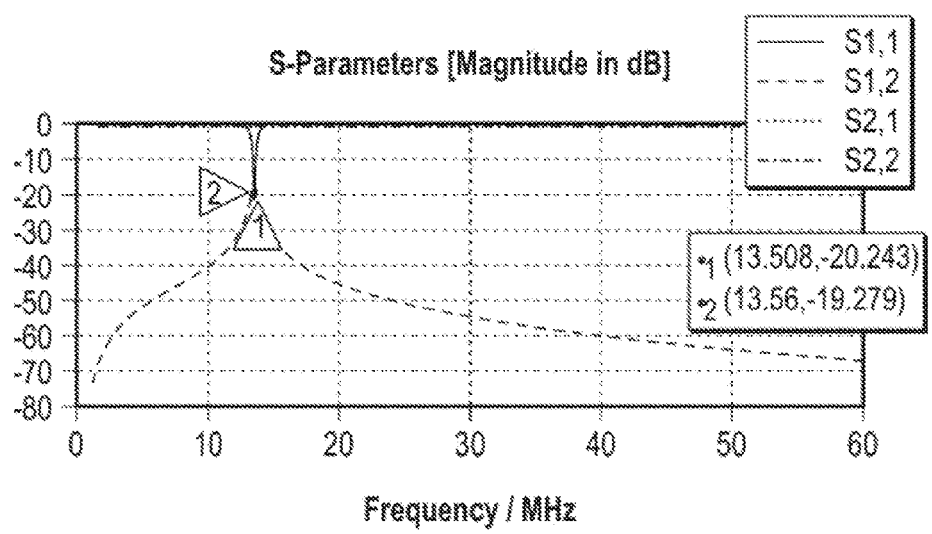
FIG. 5B is a graph illustrating coupling between the antennas of FIG. 5A according to an example embodiment.

FIG. 5A illustrates an NFC antenna 506 for wearable device 502 in proximity to a second NFC antenna 510 at a side of the NFC antenna according to an example embodiment. FIG. 5B is a graph illustrating coupling between the antennas of FIG. 5A according to an example embodiment. As shown at point 2 in FIG. 4B, the coupling is approximately −19 db at 13.56 MHz with the two coils are 30 mm apart, illustrating that the NFC antenna of the present subject matter is effective for multi-direction communication.

Figure 6A:
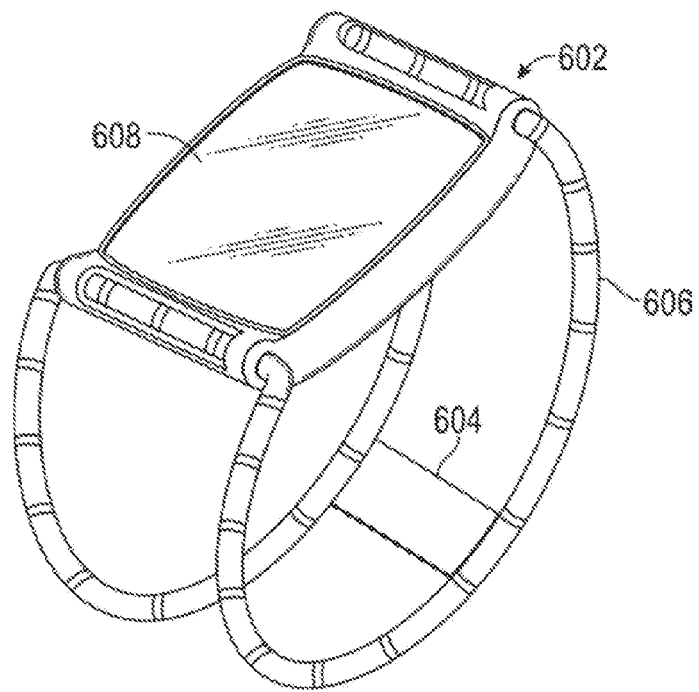
FIGS. 6A-6D illustrate perspective views of an NFC antenna for wearable application with a metallic strap according to an example embodiment.
Figure 6B:
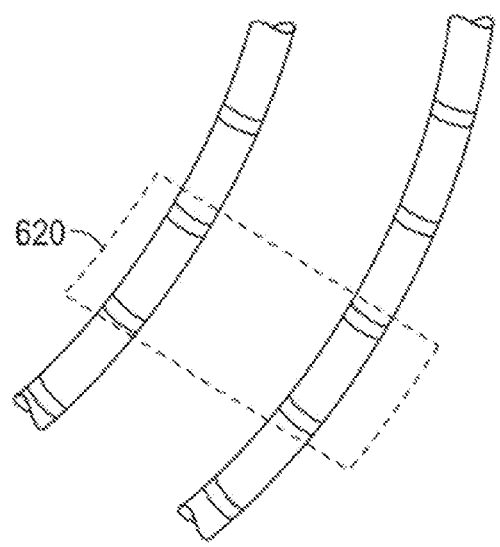
Figure 6C:
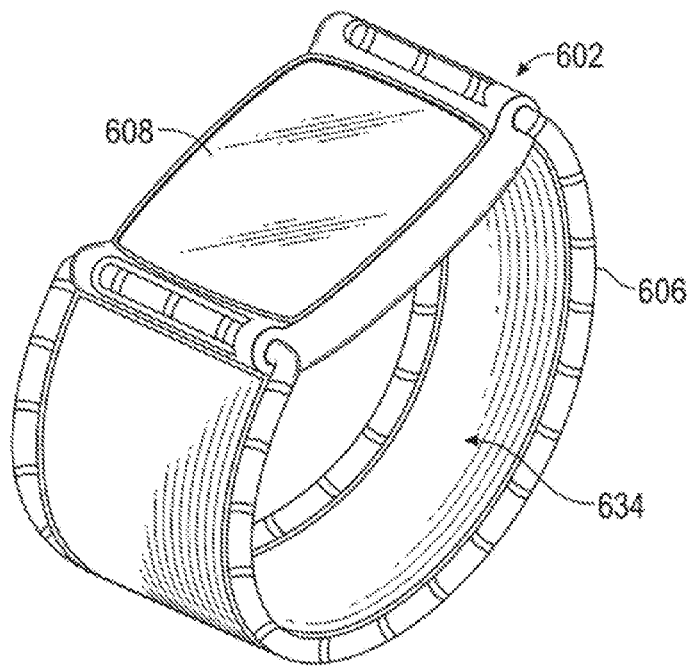
Figure 6D:
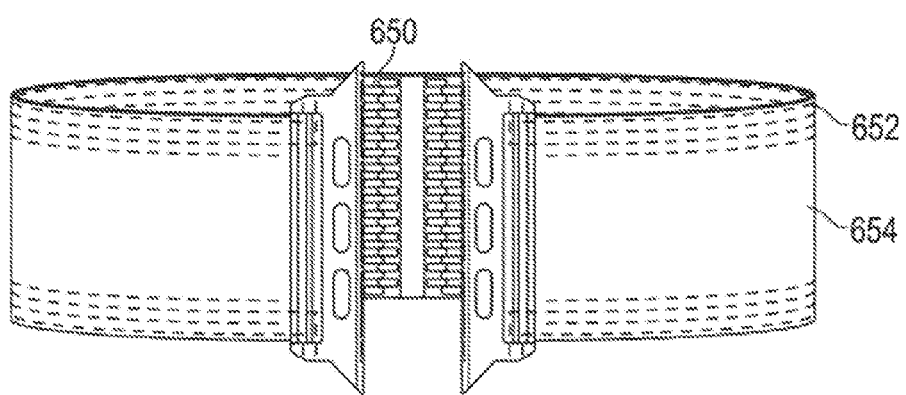

FIGS. 6A-6D illustrate an NFC antenna for wearable application with a metallic strap according to an example embodiment. In FIG. 6A, a metallic strap 606 retains the electronics block 602 including watch display 608, and the strap 606 includes the NFC antenna. The substrate 604 can be a relatively small portion 604 of the area between the metallic strap as shown in FIG. 6A, or the substrate 634 can fill the entire area between the metallic strap as shown in FIG. 6C. The strap length can be adjusted by removing or adding sections 620 of the metallic strap as shown in FIG. 6B, in various embodiments. The watch display is optional, in various embodiments. FIG. 6D illustrates a chain-type embodiment made with removable sections, including conductive portions 652 and non-conductive portions 654. A clasp 650 is used to connect the strap and to maintain the electrical connections. Various metals can be used for the metallic strap, including but not limited to copper, steel, gold and silver.

Figure 7A:
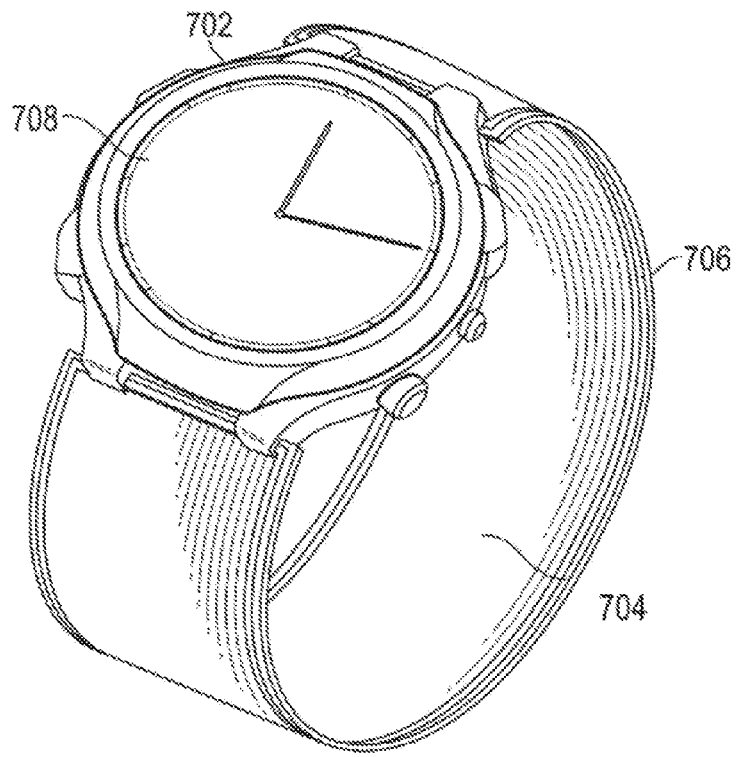
FIGS. 7A-7B illustrate a top view of an NFC antenna for wearable application with a plastic or leather strap according to an example embodiment.
Figure 7B:
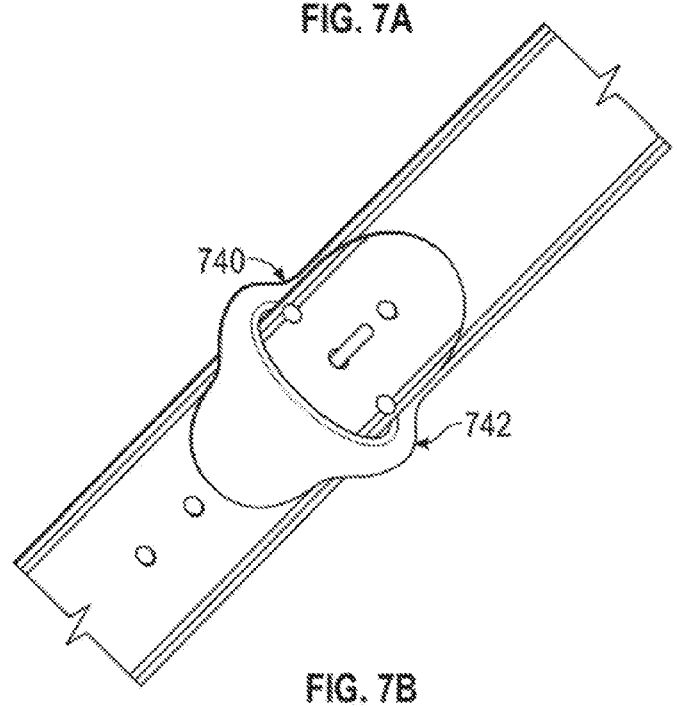

FIGS. 7A-7B illustrate an NFC antenna for wearable application with a plastic or leather strap according to an example embodiment. In FIG. 7A, a plastic or leather strap 704 retains the electronics block 702 including watch display 708, and the strap 704 acts as a dielectric for a metallic coil 706 to function as the NFC antenna. The strap length can be adjusted using an adjustment clasp 741 or buckle, and snap buttons 740 are used to make a conductive connection between coil 706 on two parts of the strap 704 joined using the clasp 741. The watch display is optional, in various embodiments. Other materials besides plastic and leather can be used without departing from the scope of the present subject matter.

Benefits of the present subject matter include: enabling NFC wireless communication in a wearable device, even if the wearable device includes a metallic body and/or strap; providing full NFC function, thus enabling the wearable device to use passive, active and peer-to-peer mode; providing for the use of either metallic or non-metallic straps and device bodies; not requiring ferrite for use as a dielectric; providing for an aesthetically appealing NFC antenna solution; decreasing cost of fabrication; supporting straps of different and adjustable sizes; and providing for multi-directional communication.

The functions or algorithms described herein may be implemented in software or a combination of software and human implemented procedures in one embodiment. The software may be in the form of computer executable instructions stored on computer readable media or computer readable storage devices such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system. Various embodiments include more than one controller in the wireless network and include distributed processing to perform the present subject matter.

Figure 8:
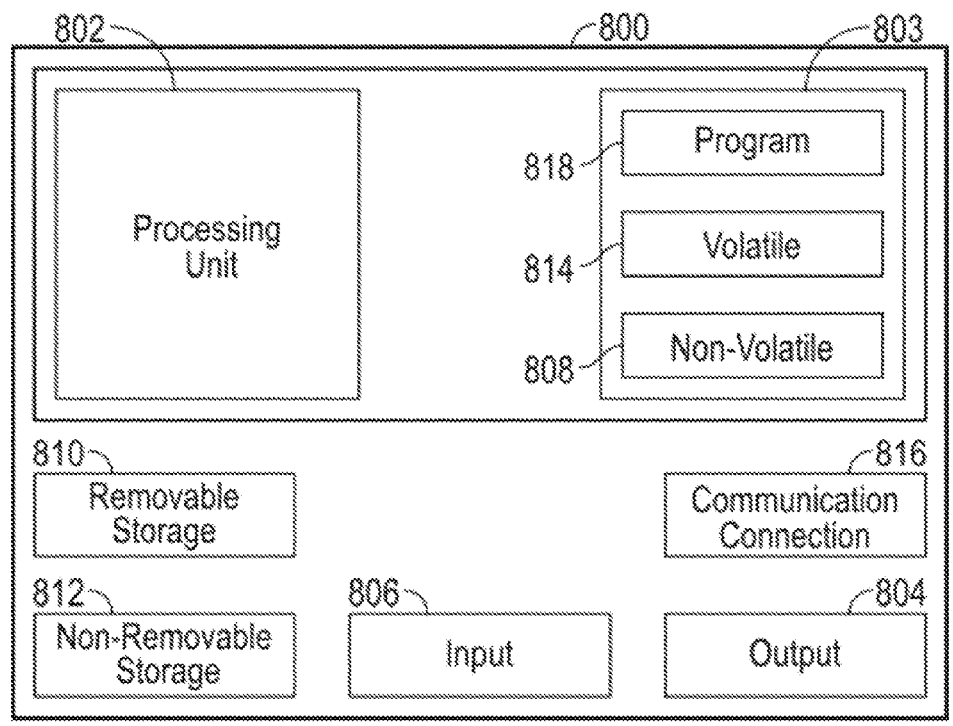
FIG. 8 is a block diagram illustrating circuitry for implementing devices to perform methods according to an example embodiment.

FIG. 8 is a block schematic diagram of a computer system 800 to implement the controller and methods according to example embodiments. All components need not be used in various embodiments. One example computing device in the form of a computer 800 may include a processing unit 802, memory 803, removable storage 810, and non-removable storage 812. Although the example computing device is illustrated and described as computer 800, the computing device may be in different forms in different embodiments. For example, the computing device may instead be a smartphone, a tablet, smartwatch, or other computing device including the same or similar elements as illustrated and described with regard to FIG. 8. Devices such as smartphones, tablets, and smartwatches are generally collectively referred to as mobile devices. Further, although the various data storage elements are illustrated as part of the computer 800, the storage may also or alternatively include cloud-based storage accessible via a network, such as the Internet. Various embodiments include more than one controller in the wireless network and include distributed processing to perform the methods of the present subject matter. For example, each base station in a cellular network may have a controller or controllers that can exchange messages with other controllers and control the network in a distributed fashion.

Memory 803 may include volatile memory 814 and non-volatile memory 808. Computer 800 may include—or have access to a computing environment that includes—a variety of computer-readable media, such as volatile memory 814 and non-volatile memory 808, removable storage 810 and non-removable storage 812. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 800 may include or have access to a computing environment that includes input 806, output 804, and a communication connection 816. Output 804 may include a display device, such as a touchscreen, that also may serve as an input device. The input 806 may include one or more of a touchscreen, touchpad, mouse, keyboard, camera, one or more device-specific buttons, one or more sensors integrated within or coupled via wired or wireless data connections to the computer 800, and other input devices. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular (3G, 4G, LTE, beyond LTE, 5G, etc.), WiFi, Bluetooth, and other networks.

Computer-readable instructions stored on a computer-readable medium are executable by the processing unit 802 of the computer 800. A hard drive, CD-ROM, and RAM are some examples of articles including a non-transitory computer-readable medium, such as a storage device. The terms computer-readable medium and storage device do not include carrier waves. For example, a computer program 818 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 800 to provide generic access controls in a COM based computer network system having multiple users and servers.

Although some embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A wearable mobile communication device, comprising:
   an electronics block including a processing unit for near field communications; and
   an adjustable strap configured to retain the electronics block when worn by a wearer, the strap including a conductive material connected to form a coil with at least one turn proximate a perimeter of the adjustable strap, and separated by a non-conductive material that configured to fill a gap between turns of the coil, wherein the coil is electrically connected to the electronics block and comprises a portion of a near field communication (NFC) antenna configured for NFC protocol communication.

2. The wearable mobile communication device of claim 1, wherein the coil is a 13.56 MHz antenna.

3. The wearable mobile communication device of claim 1, wherein the coil supports NFC antenna operation in active mode, passive mode, and peer-to-peer mode.

4. The wearable mobile communication device of claim 1, wherein the non-conductive material includes a ferrite material.

5. The wearable mobile communication device of claim 1, wherein the non-conductive material includes a dielectric material.

6. The wearable mobile communication device of claim 1, wherein the strap includes a metal.

7. The wearable mobile communication device of claim 1, wherein at least a portion of one end of the strap is within the electronics block.

8. The wearable mobile communication device of claim 1, wherein at least a portion of both ends of the strap are within the electronics block.

9. The wearable mobile communication device of claim 1, wherein no portion of the strap is within the electronics block, and the strap is connected to a feeding structure through a hinge connected to the electronics block.

10. The wearable mobile communication device of claim 1, wherein the electronics block includes a display.

11. A strap for a wearable communication device, comprising:
    a substrate portion configured to retain the wearable communication device when worn by a wearer; and
    a coil proximate a perimeter of the substrate portion of the strap, wherein the coil is electrically connected to the wearable communication device and comprises a portion of a near field communication (NFC) antenna configured for NFC protocol communication.

12. The strap of claim 11, wherein a length of the strap is adjustable by removing or adding a section of the strap without interrupting a conductive connection between portions of the coil.

13. The strap of claim 11, further comprising a retaining mechanism to hold the strap on a wearer, and further to make a conductive connection between portions of the coil on sections of the substrate portion that are joined by the retaining mechanism.

14. The strap of claim 11, wherein at least a portion of one end of the strap is within an electronics block of the wearable communication device.

15. The strap of claim 14, wherein the coil is fed using a connection to the electronics block of the wearable communication device.

16. The strap of claim 11, wherein no portion of the strap is within an electronics block of the wearable communication device, and the strap is connected to a feeding structure through a hinge connected to the electronics block.

17. A method, comprising:
    providing an adjustable strap configured to retain an electronics block when worn by a wearer, the strap formed using a coil proximate a perimeter of the adjustable strap; and
    electrically connecting the coil to the electronics block, the coil comprising a portion of a near field communication (NFC) antenna configured for NFC protocol communication.

18. The method of claim 17, comprising molding the coil in the strap.

19. The method of claim 17, comprising connecting the portion of the NFC antenna in the strap to a second portion of the NFC antenna in the electronics block.

20. The method of claim 17, comprising electrically connecting the coil to the electronics block.

* * * * *

UNITED STATES PATENT AND TRADEMARK OFFICE
CERTIFICATE OF CORRECTION

PATENT NO. : 9,998,182 B2
APPLICATION NO. : 15/012220
DATED : June 12, 2018
INVENTOR(S) : Huang et al.

Page 1 of 1

It is certified that error appears in the above-identified patent and that said Letters Patent is hereby corrected as shown below:

On the Title Page

In item (*), in "Notice", in Column 1, Line 3, delete "days. days." and insert --days.-- therefor In the Specification In Column 3, Line 20, delete "(uH) to 2 uH," and insert --(µH) to 2 µH,-- therefor In Column 3, Line 55, delete "1.6 uH" and insert --1.6 µH-- therefor In Column 4, Lines 1-2, delete "1 uH and 2 uH." and insert --1 µH and 2 µH.-- therefor In Column 6, Line 4, delete "741" and insert --742-- therefor In Column 6, Line 7, delete "741." and insert --742.-- therefor Signed and Sealed this
Twenty-third Day of July, 2019

Andrei Iancu
*Director of the United States Patent and Trademark Office*